(12) United States Patent
Bai et al.

(10) Patent No.: US 11,469,810 B2
(45) Date of Patent: Oct. 11, 2022

(54) CHANNEL QUALITY INDICATOR SENDING METHOD, AND DATA SENDING METHOD AND DEVICE

(71) Applicant: China Academy of Telecommunications Technology, Beijing (CN)

(72) Inventors: Wei Bai, Beijing (CN); Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 91 days.

(21) Appl. No.: 17/042,917

(22) PCT Filed: Mar. 21, 2019

(86) PCT No.: PCT/CN2019/079102
§ 371 (c)(1),
(2) Date: Sep. 29, 2020

(87) PCT Pub. No.: WO2019/192332
PCT Pub. Date: Oct. 10, 2019

(65) Prior Publication Data
US 2021/0021316 A1 Jan. 21, 2021

(30) Foreign Application Priority Data
Apr. 2, 2018 (CN) .......................... 201810284409.9

(51) Int. Cl.
*H04B 7/06* (2006.01)
*H04B 17/336* (2015.01)
(Continued)

(52) U.S. Cl.
CPC ......... *H04B 7/0632* (2013.01); *H04B 7/0626* (2013.01); *H04B 17/336* (2015.01);
(Continued)

(58) Field of Classification Search
CPC ..... H04L 1/0003; H04L 1/203; H04B 7/0626; H04B 17/336; H04B 7/0632; H04W 72/042; H04W 76/27
(Continued)

(56) References Cited

U.S. PATENT DOCUMENTS

| | | | |
|---|---|---|---|
| 2015/0139009 A1 | 5/2015 | Park et al. | |
| 2016/0218788 A1* | 7/2016 | Yum | .............. H04L 1/1812 |
| 2020/0059812 A1* | 2/2020 | Lyu | ................ H04L 1/0029 |

FOREIGN PATENT DOCUMENTS

| | | |
|---|---|---|
| CN | 101267388 A | 9/2008 |
| CN | 101282204 A | 10/2008 |

(Continued)

OTHER PUBLICATIONS

Ericsson,"CQI reporting for URLLC",3GPP TSG RAN WG1 Meeting 90bis, Prague, CZ, Oct. 9-13, 2017, total 4 pages, R1-1718748.
(Continued)

*Primary Examiner* — Rownak Islam
(74) *Attorney, Agent, or Firm* — Kilpatrick Townsend & Stockton, LLP

(57) ABSTRACT

Disclosed are a channel quality indication (CQI) sending method, and a data sending method and device, for use to solve the problem of low data transmission efficiency. The CQI sending method includes receiving indication information sent by a base station and used for indicating CQI transmission, the indication information comprising at least a target block error ratio for measurement feedback, a data repeated transmission frequency, and an CSI measurement resource and determining a CQI according to the target
(Continued)

block error rate for measurement feedback, the data repeated transmission frequency, and the CSI measurement resource, and sending the CQI to the base station.

18 Claims, 7 Drawing Sheets

(51) Int. Cl.
  *H04W 76/27* (2018.01)
  *H04L 1/00* (2006.01)
  *H04L 1/20* (2006.01)
  *H04W 72/04* (2009.01)
(52) U.S. Cl.
  CPC ............ *H04L 1/0003* (2013.01); *H04L 1/203* (2013.01); *H04W 72/042* (2013.01); *H04W 76/27* (2018.02)
(58) Field of Classification Search
  USPC ........................................................ 370/329
  See application file for complete search history.

(56) References Cited

FOREIGN PATENT DOCUMENTS

| | | |
|---|---|---|
| CN | 102970717 A | 3/2013 |
| CN | 104125038 A | 10/2014 |
| CN | 104468048 A | 3/2015 |
| CN | 105553616 A | 5/2016 |
| CN | 106455091 A | 2/2017 |
| WO | 2009072792 A1 | 6/2009 |
| WO | 2015128814 A2 | 9/2015 |
| WO | WO-2018044849 A1 * | 3/2018 ............ H04L 1/0011 |

OTHER PUBLICATIONS

Huawei et al.,"CSI reporting for high reliability in URLLC", 3GPP TSG RAN WG1 Meeting #90, Prague, Czech Republic, Aug. 21-25, 2017, total 7 pages, R1-1713749.

MediaTek Inc., "CQI reporting for multiple services in NR", 3GPP TSG RAN WG1 Meeting AH-1801, Vancouver, Canada, Jan. 22-26, 2018, total 6 pages, R1-1800169.

* cited by examiner

CHANNEL QUALITY INDICATOR SENDING METHOD, AND DATA SENDING METHOD AND DEVICE

The present application is a US National Stage of International Application No. PCT/CN2019/079102, filed on Mar. 21, 2019, which claims priority to Chinese Patent Application No. 201810284409.9, filed to the Chinese Patent Office on Apr. 2, 2018 and entitled "CHANNEL QUALITY INDICATOR SENDING METHOD, AND DATA SENDING METHOD AND DEVICE", the entire contents of which are incorporated herein by reference.

FIELD

The present application relates to the field of communication technologies, in particular to a channel quality indicator sending method, and a data sending method and device.

BACKGROUND

With the development and variation in requirements of a mobile communication service, a plurality of organizations such as 3GPP have begun to study a new wireless communication system (5 Generation New RAT (5G NR)) for future mobile communication systems. An important requirement of the 5G NR system is ultra reliable and low latency communications (URLLC), which leads to the emergence of transmission solutions such as the URLLC.

Solutions, such as data repetition transmission and low bit ratio transmission, are adopted in the downlink transmission solution of the URLLC to increase the reliability. In order to achieve low latency, the support to solutions, such as hybrid automatic repeat request (HARQ), is limited. In the downlink data transmission process of the URLLC, user equipment (UE) measures a signal to interference plus noise ratio (SINR), and then feeds back a channel quality indication (CQI) which is a very coarse quantization of the SINR (a quantization error is very large). According to the CQI fed back by the UE, a base station selects a modulation and coding scheme (MCS) for downlink data transmission, and meanwhile, in order to ensure reliability, the selection of the MCS is usually very conservative, which thereby not only ensures the reliability of the data transmission but also reduces efficiency of the system.

SUMMARY

The embodiments of the present application provide a channel quality indicator sending method, and a data sending method and device to solve a problem of low efficiency in data transmission.

According to a first aspect, an embodiment of the present application provides a method for transmitting a CQI at a UE side, which includes:

receiving indication information transmitted by a base station for indicating transmission of the CQI, wherein the indication information includes at least a target block error ratio (BLER) for measurement feedback, a data repetition transmission number, and a measurement resource of channel state information (CSI); and determining the CQI according to the target BLER for the measurement feedback, the data repetition transmission number, and the measurement resource of CSI, and transmitting the CQI to the base station.

According to the method for transmitting the CQI provided by the embodiment of the present application, while performing CQI feedback, UE determines the CQI according to the target BLER for the measurement feedback, the data repetition transmission number, and the measurement resource of CSI. Thus, the UE feeds back the CQI by taking the data repetition transmission number and the target BLER for the measurement feedback into consideration, so that data transmission efficiency is improved when the base station performs data transmission according to a value of the CQI.

Optionally, in the method for transmitting the CQI provided by the embodiment of the present application, said determining the CQI according to the target BLER for the measurement feedback, the data repetition transmission number and the measurement resource of CSI includes: determining a SINR according to the measurement resource of CSI; determining explicit signaling or implicit signaling transmitted by the base station for correcting the first SINR, and determining a second SINR according to the data repetition transmission number and the first SINR; and determining the CQI according to the target BLER for the measurement feedback and the second SINR.

Specifically, while determining the CQI according to the target BLER for the measurement feedback, the data repetition transmission number, and the measurement resource of CSI, the first SINR is determined according to the measurement resource of CSI, and then further corrected according to the explicit signaling or the implicit signaling to obtain the second SINR. In addition, the data repetition transmission number shall be considered during correction of the first SINR, so as to further ensure accuracy of the CQI determined by the UE and thereby help to improve the efficiency when the base station transmits data.

Optionally, in the method for transmitting the CQI provided by the embodiment of the present application, said determining the explicit signaling transmitted by the base station for correcting the first SINR includes: receiving the explicit signaling transmitted by the base station for correcting the first SINR through radio resource control (RRC) signaling and/or downlink control information (DCI) signaling.

Specifically, resources occupied by the signaling are saved by transmitting the explicit signaling through the RRC signaling and/or the DCI signaling.

Optionally, in the method for transmitting the CQI provided by the embodiment of the present application, said determining the implicit signaling transmitted by the base station for correcting the first SINR includes: determining the target BLER for the measurement feedback as a target BLER corresponding to URLLC according to the target BLER for the measurement feedback.

Specifically, the resources occupied by the signaling are saved by determining whether the first SINR needs to be corrected in an implicit signaling manner.

Optionally, in the method for transmitting the CQI provided by the embodiment of the present application, the second SINR is determined according to the data repetition transmission number and the first SINR with a following formula: $B=A+10*\log10(N)$, wherein N is a positive integer, wherein N represents the data repetition transmission number, A represents the first SINR, and B represents the second SINR.

Optionally, in the method for transmitting the CQI provided by the embodiment of the present application, said determining the second SINR according to the data repetition transmission number and the first SINR includes:

determining the second SINR corresponding to the data repetition transmission number and the first SINR according to a pre-stored correspondence among the data repetition transmission number, the first SINR and the second SINR.

Optionally, in the method for transmitting the CQI provided by the embodiment of the present application, said determining the CQI according to the target BLER for the measurement feedback and the second SINR includes: determining the CQI corresponding to the target BLER for the measurement feedback and the second SINR according to a pre-stored correspondence among the target BLER, the SINR and the CQI.

According to a second aspect, an embodiment of the present application provides a method for transmitting data at a base station side, which includes:

receiving a CQI transmitted by UE, wherein the CQI is a CQI determined by the UE according to a target BLER for measurement feedback, a data repetition transmission number, and a measurement resource of CSI;

determining a MCS according to the CQI transmitted by the UE and the target BLER required by a service; and transmitting downlink data to the UE according to the MCS and the data repetition transmission number.

Specifically, according to the present application, after receiving the CQI transmitted by the UE, the base station further determines the MCS based on the CQI transmitted by the UE and the target BLER required by the service, so that the base station not only determines the CQI with reference to the target BLER for the measurement feedback, but also determines the corresponding MCS with reference to the target BLER required by the service during data transmission, thereby improving data transmission efficiency.

Optionally, in the method for transmitting data provided by the embodiment of the present application, said determining the MCS according to the CQI transmitted by the UE and the target BLER required by the service includes: determining a third SINR according to the CQI transmitted by the UE and the target BLER for the measurement feedback, when the target BLER required by the service is inconsistent with the target BLER for the measurement feedback; and determining the MCS according to the third SINR and the target BLER required by the service.

Optionally, in the method for transmitting data provided by the embodiment of the present application, said determining the third SINR according to the CQI transmitted by the UE and the target BLER for the measurement feedback includes: determining the CQI transmitted by the UE and the third SINR corresponding to the target BLER for the measurement feedback, according to a pre-stored correspondence among the target BLER, the SINR and the CQI.

Optionally, in the method for transmitting data provided by the embodiment of the present application, before receiving the CQI transmitted by the UE, the method further includes: transmitting indication information for indicating transmission of the CQI to the UE, wherein the indication information includes at least the target BLER for the measurement feedback, the data repetition transmission number, and the measurement resource of CSI.

Optionally, in the method for transmitting data provided by the embodiment of the present application, before receiving the CQI transmitted by the UE, the method further includes: transmitting explicit signaling or implicit signaling for correcting the first SINR to the UE, wherein the first SINR is determined by the UE according to the measurement resource of CSI.

Optionally, in the method for transmitting data provided by the embodiment of the present application, said transmitting the explicit signaling for correcting the first SINR to the UE includes: transmitting a correction instruction for correcting the first SINR to the UE through RRC signaling and/or DCI signaling.

According to a third aspect, an embodiment of the present application provides a device for transmitting a CQI at a UE side, which includes:

a memory, configured to store program instructions; and a processor, configured to call the program instructions stored in the memory and execute flowing operations according to programs as obtained:

receiving indication information transmitted by a base station for indicating transmission of the CQI via a transceiver, wherein the indication information includes at least a target BLER for measurement feedback, a data repetition transmission number, and a measurement resource of CSI; and determining the CQI according to the target BLER for the measurement feedback, the data repetition transmission number, and the measurement resource of CSI, and transmitting the CQI to the base station via the transceiver.

Optionally, in the device for transmitting the CQI provided by the embodiment of the present application, when the processor determines the CQI according to the target BLER for the measurement feedback, the data repetition transmission number and the measurement resource of CSI, the processor is specifically configured to: determine a first SINR according to the measurement resource of CSI; determine explicit signaling or implicit signaling transmitted by the base station for correcting the first SINR, and determine a second SINR according to the data repetition transmission number and the first SINR; and determine the CQI according to the target BLER for the measurement feedback and the second SINR.

Optionally, in the device for transmitting the CQI provided by the embodiment of the present application, said determining the explicit signaling transmitted by the base station for correcting the first SINR specifically includes: receiving the explicit signaling transmitted by the base station for correcting the first SINR through RRC signaling and/or DCI signaling.

Optionally, in the device for transmitting the CQI provided by the embodiment of the present application, said determining the implicit signaling transmitted by the base station for correcting the first SINR specifically includes: determining the target BLER for measurement feedback as a target BLER corresponding to URLLC according to the target BLER for measurement feedback.

Optionally, in the device for transmitting the CQI provided by the embodiment of the present application, the second SINR is determined according to the data repetition transmission number and the first SINR with a following formula: $B=A+10*\log 10(N)$, wherein N is a positive integer, wherein N represents the data repetition transmission number, A represents the first SINR, and B represents the second SINR.

Optionally, in the device for transmitting the CQI provided by the embodiment of the present application, said determining the second SINR according to the data repetition transmission number and the first SINR specifically includes: determining the second SINR corresponding to the data repetition transmission number and the first SINR according to a pre-stored correspondence among the data repetition transmission number, the first SINR and the second SINR.

Optionally, in the device for transmitting the CQI provided by the embodiment of the present application, said determining the CQI according to the target BLER for the measurement feedback and the second SINR specifically includes: determining the CQI corresponding to the target BLER for the measurement feedback and the second SINR according to a pre-stored correspondence among the target BLER, the SINR and the CQI.

According to a fourth aspect, an embodiment of the present application provides a device for transmitting data at a base station side, which includes:

a memory, configured to store program instructions; and a processor, configured to call the program instructions stored in the memory and execute following operations according to programs as obtained:

receiving a CQI transmitted by UE via a transceiver, wherein the CQI is a CQI determined by the UE according to a target BLER for measurement feedback, a data repetition transmission number, and a measurement resource of CSI;

determining a MCS according to the CQI transmitted by the UE and the target BLER required by a service; and transmitting downlink data to the UE according to the MCS and the data repetition transmission number.

Optionally, in the device for transmitting data provided by the embodiment of the present application, said determining the MCS according to the CQI transmitted by the UE and the target BLER required by the service specifically includes: determining a third SINR according to the CQI transmitted by the UE and the target BLER for the measurement feedback, when the target BLER required by the service is inconsistent with the target BLER for the measurement feedback; and determining the MCS according to the third SINR and the target BLER required by the service.

Optionally, in the device for transmitting data provided by the embodiment of the present application, said determining the third SINR according to the CQI transmitted by the UE and the target BLER for the measurement feedback specifically includes: determining the CQI transmitted by the UE and the third SINR corresponding to the target BLER for the measurement feedback, according to a pre-stored correspondence among the target BLER, the SINR and the CQI.

Optionally, in the device for transmitting data provided by the embodiment of the present application, before receiving the CQI transmitted by the UE via the transceiver, the processor is further configured to: transmit indication information for indicating transmission of the CQI to the UE, wherein the indication information comprises at least the target BLER for the measurement feedback, the data repetition transmission number, and the measurement resource of CSI.

Optionally, in the device for transmitting data provided by the embodiment of the present application, before receiving the CQI transmitted by the UE via the transceiver, the processor is further configured to: transmit explicit signaling or implicit signaling for correcting a first SINR to the UE via the transceiver, wherein the first SINR is determined by the UE according to the measurement resource of CSI.

Optionally, in the device for transmitting CQI provided by the embodiment of the present application, said transmitting the explicit signaling for correcting the first SINR to the UE specifically includes: transmitting a correction instruction for correcting the first SINR to the UE through RRC signaling and/or DCI signaling.

According to a fifth aspect, an embodiment of the present application further provides a device for transmitting a CQI at a UE side, which includes:

a receiving unit, configured to receive indication information transmitted by a base station for indicating transmission of the CQI, wherein the indication information includes at least a target BLER for measurement feedback, a data repetition transmission number, and a measurement resource of CSI; and a transmitting unit, configured to determine the CQI according to the target BLER for the measurement feedback, the data repetition transmission number, and the measurement resource of CSI, and transmit the CQI to the base station.

According to a sixth aspect, an embodiment of the present application further provides a device for transmitting data at a base station side, which includes:

a receiving unit, configured to receive a CQI transmitted by UE, wherein the CQI is a CQI determined by the UE according to a target BLER for measurement feedback, a data repetition transmission number, and a measurement resource of CSI;

a determining unit, configured to determine a MCS according to the CQI transmitted by the UE and the target BLER required by a service; and a transmitting unit, configured to transmit downlink data to the UE according to the MCS and the data repetition transmission number.

According to a seventh aspect, an embodiment of the present application further provides a computer storage medium, wherein computer-executable instructions are stored in the computer storage medium and configured to actuate a computer to execute any one of the aforesaid methods provided in the embodiments of the present application.

BRIEF DESCRIPTION OF THE DRAWINGS

In order to more clearly illustrate embodiments of the present application, accompany drawings as required in illustration of the embodiments will be briefly described below. Apparently, the accompanying drawings in the following description show merely some embodiments of the present application.

DETAILED DESCRIPTION OF THE EMBODIMENTS

Figure 1:
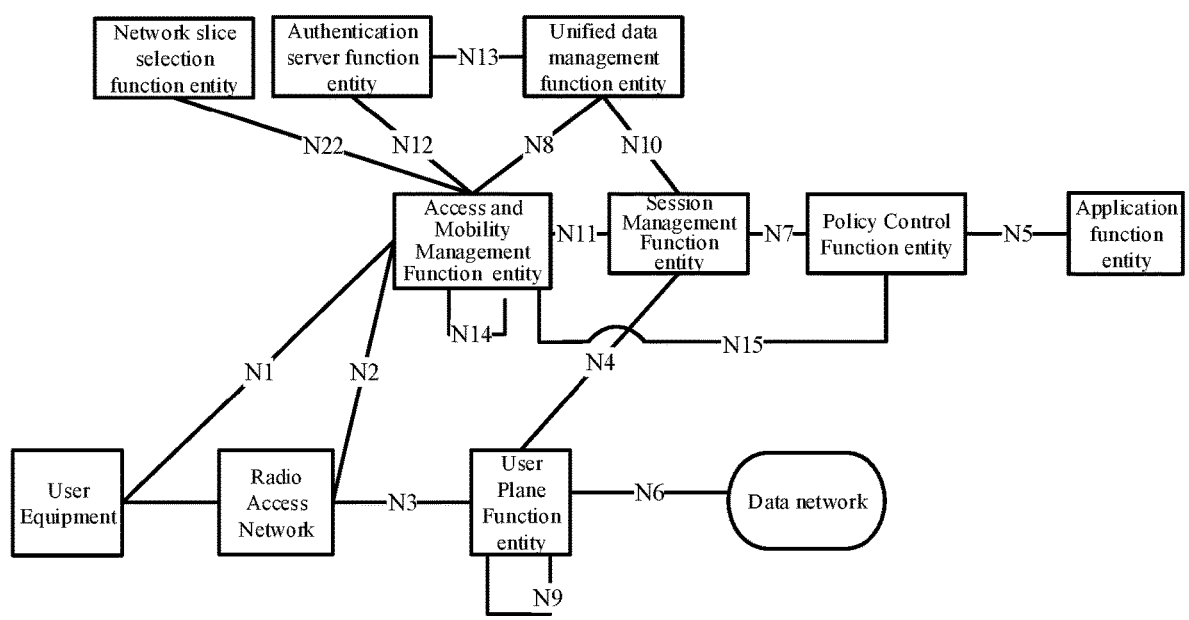
FIG. 1 is a schematic structural diagram of a 5G network system provided by an embodiment of the present application.

In a current 3GPP, during downlink transmission of URLLC, when a base station schedules resources for data transmission, a plurality of resources may be allocated at a time to support the same block of data (which may be different Redundancy Versions (RVs)) to perform repetition transmission on the plurality of resources, without waiting for feedback from UE for COI, which thereby ensures reliability of the data transmission without increasing a time delay. A repetition transmission number is notified to the UE by the base station through RRC signaling. The UE performs soft combining and decoding on the received and repeatedly transmitted data according to the RRC signaling.

In the current 3GPP, a CQI report mode during the downlink transmission of the URLLC includes that:

(1) the base station configures measurement resources of CSI and a CSI feedback solution through the RRC signaling;

(2) the UE measures a SINR according to measurement resource information of CSI configured by the base station;

(3) the UE determines a CQI corresponding to the measured SINR according to the measured SINR; and (4) the UE transmits the CQI to the base station according to the configured CSI feedback solution.

For example, if the UE determines that the measured SINR is −4.6 dB according to the measurement resources of CSI, it can be determined according to Table 1 that the CQI corresponding to the measured SINR which is −4.6 dB is 3.

Table 1 shows the range of the SINR corresponding to each CQI, in unit of dB.

TABLE 1

| CQI index = 1 | CQI index = 2 | CQI index = 3 | CQI index = 4 |
|---|---|---|---|
| QPSK, 50/1024 | QPSK, 78/1024 | QPSK, 120/1024 | QPSK, 193/1024 |
| (−9.7, −7.7) | (−7.7, −5.8) | (−5.8, −3.8) | (−3.8, . . .) |

It can be seen from Table 1 that when the SINR measured by the UE falls within a certain range, the CQI corresponding to the range is namely an appropriate CQI, and thereby the corresponding quadrature phase shift keying (QPSK) can be further determined according to the CQI.

However, when the repetition transmission is employed in the downlink transmission of the URLLC, the UE may employs soft combining and decoding to obtain a higher equivalent SINR. For example, if the SINR measured by the UE is −6.5 dB, the repetition transmission number configured by the base station is 2. Under normal circumstances, according to the Table 1 above, −6.5 falls within the range of (−7.7, −5.8), and a user may select the CQI that equals to 2 for reporting. Then, based on the CQI reported by the user and the repetition transmission number of 2, the base station may determine that the maximum gain of the two repetition transmissions is 3 dB. Therefore, the base station determines that the corresponding SINR range becomes (−7.7, −5.8)+3, which is (−4.7, −2.8), and the base station will conservatively select a CQI of 3 for subsequent data transmission. In fact, because −3.5 which is −6.5+3 falls within (−3.8, . . . ), the base station may select a CQI of 4 for downlink data transmission. Therefore, since the UE does not consider the repetition transmission number when reporting the CQI, the base station cannot accurately determine the corresponding CQI, thereby reducing the efficiency of data transmission.

In view of this, the embodiments of the present application mainly solve the problem in a 5G system regarding how the UE considers the repetition transmission number when reporting the CQI to ensure that the base station can accurately determine the corresponding CQI and thus improve the efficiency of data transmission.

The following will introduce a 5G network architecture firstly, as shown in FIG. 1. The 5G network architecture mainly includes following network entity functions.

A radio access network (RAN) is a network composed of at least one 5G-RAN node, which implements radio physical layer functions, resource scheduling and radio resource management, radio access control, and mobility management functions. 5G-RAN is connected with a user plane function (UPF) through a user plane interface N3, and is configured to transmit data of terminal equipment. The 5G-RAN also establishes a control plane signaling connection through a control plane interface N2 and an access and mobility management function (AMF) entity to implement functions such as radio access bearer control. The 5G-RAN node may specifically be a base transceiver station (BTS) in a global system for mobile communication (GSM) or a code division multiple access (CDMA) system, a base station (NodeB) in a wideband code division multiple access (WCDMA) system, an evolutional Node B (eNB) in an LTE system, or may be base station equipment, small base station equipment, a wireless access point (WiFi AP) or the like in the future 5G network, which is not limited in the present application.

The AMF is mainly responsible for authentication of the UE, mobility management of the UE, selection of network slices, selection of a session management function (SMF) and other functions. The AMF serves as an anchor point for an N1 and N2 signaling connection and provides N1/N2 SM message routing for the SMF. The AMF also maintains and manages status information of the UE.

The SMF is mainly responsible for all control plane functions of the UE session management, including UPF selection, internet protocol (IP) address allocation, quality of service (QoS) management of session, and obtaining policy and charging control (PCC) strategies from a policy control function (PCF) entity, and the like.

A UPF serves as an anchor point of a protocol data unit (PDU) session connection, and is responsible for data message filtering, data transmission/forwarding, ratio control, and charging information generation for the UE, and the like.

The terminal equipment may also be referred to as the UE, a mobile station (MS), a mobile terminal, etc. Optionally, the terminal may have an ability to communicate with one or more core networks via the RAN. For example, the terminal may be a mobile phone (or "cellular" phone) or a computer with a mobile attribute, or the like. For example, the terminal may also be a portable, pocket, handheld, computer built-in or in-vehicle mobile device.

Figure 2:
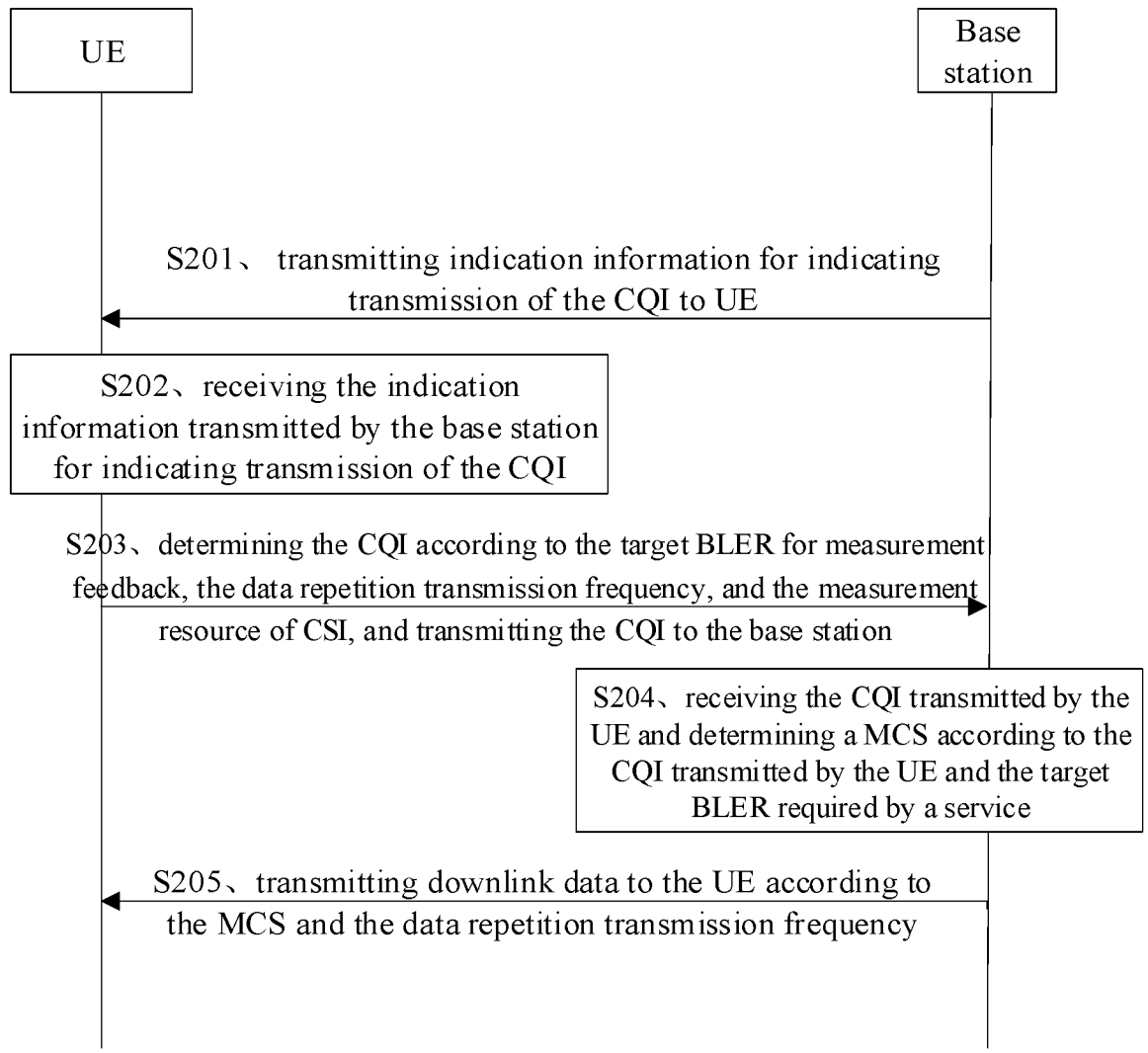
FIG. 2 is a schematic flowchart of a method for transmitting a CQI and a method for transmitting data provided by embodiments of the present application.

As shown in FIG. 2, the method for transmitting a CQI and the method for transmitting data provided by embodiments of the present application include following steps.

A base station transmits indication information for indicating transmission of the CQI to UE, and the indication information includes at least a target BLER for measurement feedback, a data repetition transmission number, and a measurement resource of CSI.

Optionally, when the base station transmits the indication information for indicating transmission of the CQI to the UE in step S201, the indication information may be transmitted through RRC signaling and/or DCI signaling to save resources occupied by the signaling.

S202: The UE receives the indication information transmitted by the base station for indicating transmission of the CQI.

S203: The UE determines the CQI according to the target BLER for measurement feedback, the data repetition transmission number, and the measurement resource of CSI, and transmits the CQI to the base station.

S204: The base station receives the CQI transmitted by the UE and determines a MCS according to the CQI transmitted by the UE and the target BLER required by a service.

S205: The base station transmits downlink data to the UE according to the MCS and the data repetition transmission number.

It should be noted that the target BLER for the measurement feedback in the embodiments of the present application refers to a corresponding preset target BLER for feeding back the CQI by the UE when the base station transmits the indication information for indicating transmission of the CQI to the UE. The data repetition transmission number in the embodiments of the present application refers to a repetition number when the physical downlink shared channel (PDSCH) is transmitted rather than the repetition number of a measurement resource of CSI.

Optionally, determining the CQI according to the target BLER for the measurement feedback, the data repetition transmission number, and the measurement resource of CSI via the UE in step 203 includes:

determining a first SINR according to the measurement resources of CSI; determining explicit signaling or implicit signaling transmitted by the base station for correcting the first SINR, and determining a second SINR according to the data repetition transmission number and the first SINR; and determining the CQI according to the target BLER for the measurement feedback and the second SINR.

Specifically, after receiving the indication information for indicating transmission of the CQI, the UE performs a single measurement on the measurement resource of CSI according to the measurement resource of CSI to calculate the corresponding first SINR. Then, after receiving the explicit signaling or the implicit signaling, the UE determines the second SINR according to the data repetition transmission number carried in the indication information for indicating transmission of the CQI and the first SINR as calculated. Furthermore, according to the target BLER for the measurement feedback carried in the indication information for indicating transmission of the CQI and the second SINR as calculated, the UE determines the second SINR and the CQI corresponding to the target BLER for the measurement feedback.

Specifically, in the embodiment of the present application, the UE determines the first SINR according to the measurement resource of CSI; and a signal power and an interference power can be measured on channel measurement CSI-RS and interference measurement CSI-RS respectively according to the measurement resource of CSI. The signal power is an average value of the signal power on all measurement resources of CSI, and the interference power is an average value of the interference power on all the measurement resources of CSI. The first SINR can be determined according to the signal power and the interference power. In addition, in the embodiment of the present application, determining the first SINR according to the measurement resource of CSI includes: determining the first SINR according to the single measurement on the measurement resource of CSI, thereby further improving the efficiency in calculating the SINR.

It should be noted that: the first SINR in the embodiment of the present application is an SINR determined directly according to the measurement resource of CSI; and the second SINR is an SINR after the first SINR is corrected according to the data repetition transmission number. The CQI is determined according to the target BLER for the measurement feedback and the second SINR, and is a CQI corresponding to the target BLER for the measurement feedback and the second SINR. That is, the target BLER for the measurement feedback, the second SINR, and the CQI are in one-to-one correspondence in the embodiment of the present application.

Optionally, determining the explicit signaling transmitted by the base station for correcting the first SINR in the embodiment of the present application includes: receiving the explicit signaling transmitted by the base station for correcting the first SINR through the RRC signaling and/or the DCI signaling. Specifically, in the embodiment of the present application, the base station may meanwhile carry the explicit signaling for correcting the first SINR while transmitting the indication information for indicating transmission of the CQI through the RRC signaling; or the base station may meanwhile carry the explicit signaling for correcting the first SINR while transmitting the indication information for indicating transmission of the CQI through the DCI signaling; or the base station may meanwhile carry the explicit signaling for correcting the first SINR while transmitting the indication information for indicating transmission of the CQI through the RRC signaling and the DCI signaling.

Specifically, when the base station in the embodiment of the present application transmits the indication information for indicating transmission of the CQI to the UE, the indication information may also carry a CSI report mode. If the UE determines that the report is an aperiodic report according to the CSI report mode in the indication information, the base station shall transmit the CSI report request information to the UE through the DCI signaling. If the UE determines that the report is a semi-continuous report according to the CSI report mode in the indication information, the base station may activate the CSI report of the UE through the DCI signaling or a media access control control element (MAC CE).

Optionally, determining the implicit signaling transmitted by the base station for correcting the first SINR includes: determining the target BLER for the measurement feedback as a target BLER corresponding to URLLC according to the target BLER for the measurement feedback. Specifically, when the target BLER for the measurement feedback which is in the indication information is the target BLER corresponding to the URLLC, the UE may correct the first SINR by default and determine the CQI in combination with the target BLER for the measurement feedback; wherein the indication information is for indicating transmission of the CQI and received by the UE.

Optionally, in the embodiment of the present application, the second SINR may be determined according to the data repetition transmission number and the first SINR with the following formula, such as:

$$B = A + 10*\log 10(N), \text{ wherein } N \text{ is a positive integer,}$$

wherein N represents the data repetition transmission number, A represents the first SINR, and B represents the second SINR.

Thus, in the embodiment of the present application, when the first SINR is corrected according to the data repetition transmission number, the correction may be performed according to the aforesaid formula. Hence, in the embodiment of the present application, the CQI determined by the UE based on the SINR has been corrected by the UE according to the data repetition transmission number, which further improves high efficiency of the data transmission.

Optionally, according to the embodiment of the present application, determining the second SINR according to the data repetition transmission number and the first SINR further includes: determining the second SINR corresponding to the data repetition transmission number and the first SINR according to a pre-stored correspondence among the data repetition transmission number, the first SINR and the second SINR. Specifically, the correspondence for correcting the SINR is pre-stored at the UE side. For example, a correspondence of different second SINRs corresponding to different first SINRs and different data repetition transmission frequencies may be formed according to a preset correction rule. The UE side may perform storage in a table form or other manners, so that the UE can determine the corresponding second SINR after determining the data repetition transmission number and the first SINR. Specifically, in the pre-stored correspondence for correcting the SINR, each element in the first SINR may be a range value of the SINR, and each element in the second SINR may be a range value or a fixed value of the SINR, which is not limited herein.

Optionally, according to the embodiment of the present application, determining the CQI according to the target BLER for the measurement feedback and the second SINR includes: determining the CQI corresponding to the target BLER for the measurement feedback and the second SINR according to a pre-stored correspondence among the target BLER, the SINR and the CQI. Specifically, the correspondence among the target BLER, the SINR and the CQI can be pre-stored at the UE side. That is, different target BLERs and different SINR ranges correspond to different CQIs. The correspondence may be stored in a table or other forms, so that the UE can determine the corresponding CQI according to the value of the SINR and target BLER after determining the target BLER and the SINR, or can further determine the SINR according to the target BLER and the value of the CQI. It should be noted that, for the correspondence among the target BLER, the SINR and the CQI as pre-stored in the embodiment of the present application, each element in the SINR may be a range value of the SINR, which is not specifically limited herein.

Optionally, in the embodiment of the present application, when the base station transmits the indication information for indicating transmission of the CQI to the UE, the indication information further includes a CSI report resource; and transmitting the CQI to the base station in step S203 via the UE further includes: transmitting the CQI determined according to the target BLER for the measurement feedback and the second SINR to the base station via the UE according to the CSI report resource and the CSI report mode.

Optionally, in step 204 of the embodiment of the present application, determining the MCS according to the CQI transmitted by the UE and the target BLER required by the service includes: determining a third SINR according to the CQI transmitted by the UE and the target BLER for the measurement feedback when the target BLER required by the service is inconsistent with the target BLER for the measurement feedback; and determining the MCS according to the third SINR and the target BLER required by the service. Specifically, when the target BLER required by the service is inconsistent with the target BLER for the measurement feedback, the base station shall further update the CQI through a finger insertion algorithm and determine the MCS based on the updated CQI, so as to ensure that the spectral efficiency of the MCS determined by the base station is the closest to and does not exceed the spectral efficiency corresponding to the CQI transmitted by the UE.

Specifically, the third SINR is determined according to the CQI transmitted by the UE and the target BLER for the measurement feedback; and determining the MCS, namely updating the CQI, according to the third SINR and the target BLER required by the service specifically includes following steps.

Step 1: The SINR corresponding to the CQI transmitted by the UE and the target BLER for the measurement feedback is determined according to the pre-stored correspondence among the target BLER, the SINR and the CQI. The base station side may pre-store the correspondence among the target BLER, the SINR and the CQI in a table or other forms, and the correspondence among the target BLER, the SINR and the CQI as pre-stored in the base station side is same with the correspondence among the target BLER, the SINR and the CQI pre-stored at the UE side. In addition, the value of each SINR element in the correspondence may be a range value of the SINR.

Step 2: A conservative value in the SINR range value, namely a lower boundary value, is taken as the third SINR when the SINR determined according to the correspondence among the target BLER, the SINR and the CQI is the range value. For example, if the SINR determined by the correspondence among the target BLER, the SINR and the CQI is (−4.1, −2.1), it may be determined that the value of the third SINR is −4.1.

Step 3: The CQI (i.e., the updated CQI) corresponding to the third SINR and the target BLER required by the service is determined according to the pre-stored correspondence among the target BLER, the SINR and the CQI, and further the MCS corresponding to the updated CQI is determined. The pre-stored correspondence among the target block error ratio, the SINR and the CQI further includes: the MCS corresponding to each CQI. Thus, after determining the CQI corresponding to the third SINR and the target BLER required by the service according to the pre-stored correspondence among the target BLER, the SINR and the CQI, the MCS corresponding to the updated CQI can be determined according to the MCS corresponding to the CQI in the pre-stored correspondence among the target BLER, the SINR and the CQI.

It should be noted that when the target BLER required by the service is consistent with the target BLER for the measurement feedback, the step of updating the CQI can be omitted, and the corresponding MCS can be determined directly according to the CQI fed back by the UE. That is, there is no need to determine the third SINR according to the CQI transmitted by the UE and the target BLER for the measurement feedback and also no need to update the CQI.

Specifically, when the base station transmits the downlink data to the UE according to the MCS and the data repetition transmission number in step S205, the base station may respectively map the downlink data that needs to be transmitted to the UE to the corresponding resources according to the data repetition transmission number, and then transmit the data according to the data repetition transmission number.

Embodiment 1

Figure 3:
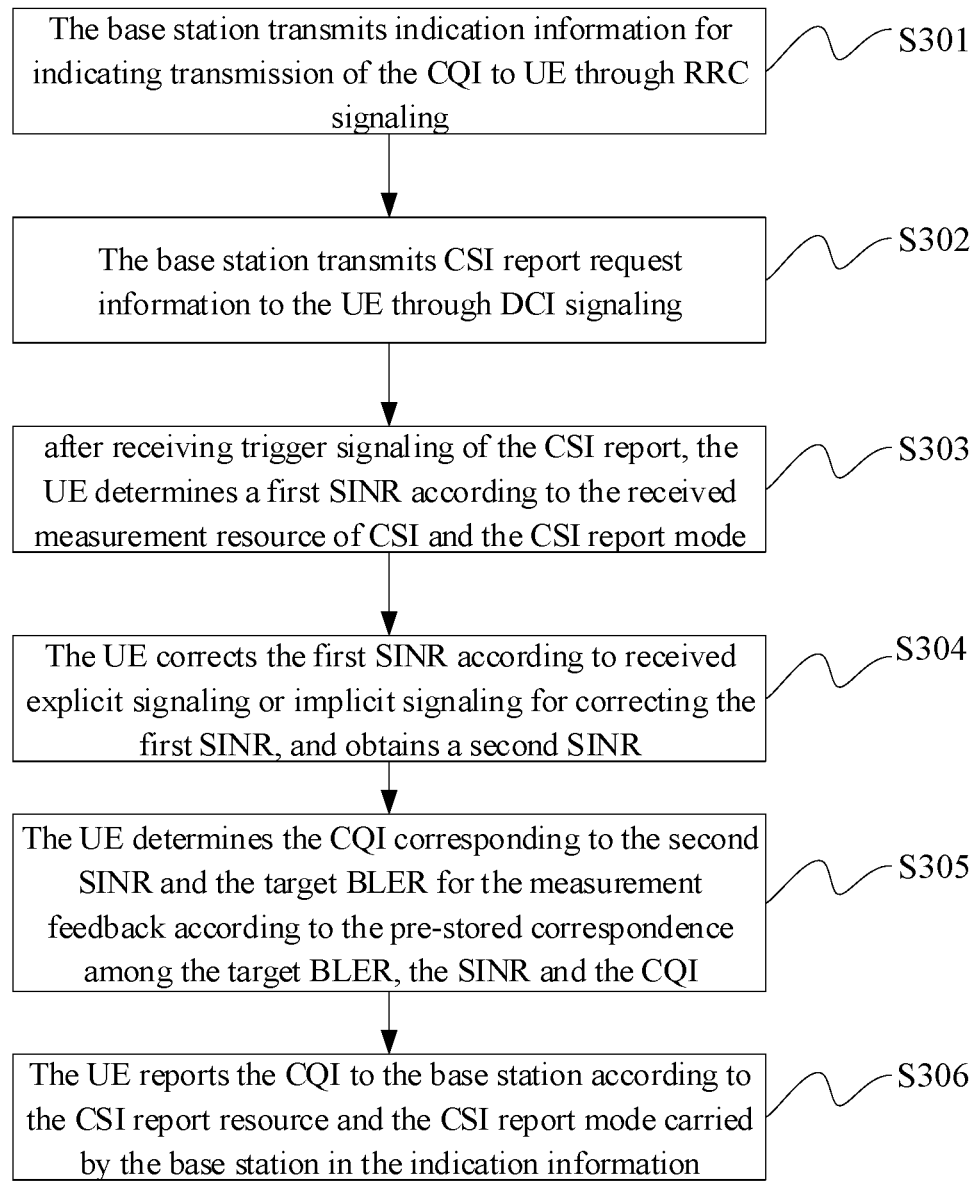
FIG. 3 is a specific schematic flowchart of a method for transmitting a CQI provided by an embodiment of the present application.

The method for transmitting a CQI provided by the embodiment of the present application will be described in detail below through specific embodiments. As shown in FIG. 3, the method includes following steps.

S301: The base station transmits indication information for indicating transmission of the CQI to UE through RRC signaling.

The indication information includes: a data repetition transmission number which is 2; a target BELR for measurement feedback which is 1E-5; and a measurement resource of CSI which includes a CSI reference signal (CSI-RS) resource of channel measurement and a CSI-RS resource of interference measurement, a CSI report resource and a CSI report mode. The CSI report mode may be an aperiodic short Physical Uplink Control Channel (PUCCH) report resource.

S302: The base station transmits CSI report request information to the UE through DCI signaling.

The CSI report request information is configured to trigger CSI report of the UE, wherein the CSI report as triggered includes at least CQI report.

S303: after receiving trigger signaling of the CSI report, the UE determines a first SINR according to the received measurement resource of CSI and the CSI report mode.

Specifically, a noise power is calculated by measuring a signal power and an interference power for a single time on the CSI-RS of channel measurement and the CSI-RS of interference measurement, thereby calculating the first SINR. It is assumed that the first SINR equals to −6.5 dB. By determining the first SINR through single measurement, the timeliness in calculating the first SINR can be improved.

S304: The UE corrects the first SINR according to received explicit signaling or implicit signaling for correcting the first SINR, and obtains a second SINR.

When the data is required to be transmitted in an ultra reliable and low latency transmission mode, the base station may inform the UE to correct the first SINR through the explicit signaling or implicit signaling. Thus, instead of directly reporting the CQI corresponding to the target BLER which is 1E-5 and the first SINR for the measurement feedback which equals to −6.5 dB, the UE will continue to correct the first SINR; and the UE calculates the second SINR according to the data repetition transmission number, also named as a slot-aggregation parameter, configured by the base station.

Correction of the first SINR may be determined according to an aforesaid formula or a preset correspondence among the first SINR, the data repetition transmission number, and the second SINR. For example, when the data repetition transmission number is 2 and the first SINR equals to −6.5 dB, it can be determined according to the formula that the second SINR is $-6.5 + 10 \cdot \log 10(2)$, which is −3.5 dB.

S305: The UE determines the CQI corresponding to the second SINR and the target BLER for the measurement feedback according to the pre-stored correspondence among the target BLER, the SINR and the CQI.

For example, Table 2 shows the pre-stored correspondence among the target BLER, the SINR and the CQI at the UE side.

TABLE 2

|  | CQI index = 1 QPSK, 50/1024 | CQI index = 2 QPSK, 78/1024 | CQI index = 3 QPSK, 120/1024 | CQI index = 4 QPSK, 193/1024 |
| --- | --- | --- | --- | --- |
| BLER = 1E-1 | (−9.7, −7.7) | (−7.7, −5.8) | (−5.8, −3.8) | (−3.8, . . .) |
| BLER = 1E-2 | (−9.2, −7.2) | (−7.2, −5.4) | (−5.4, −3.2) | (−3.2, . . .) |
| BLER = 1E-3 | (−8.8, −6.8) | (−6.8, −4.9) | (−4.9, −2.8) | (−2.8, . . .) |
| BLER = 1E-4 | (−8.4, −6.4) | (−6.4, −4.5) | (−4.5, −2.4) | (−2.4, . . .) |
| BLER = 1E-5 | (−8.0, −6.1) | (−6.1, −4.1) | (−4.1, −2.1) | (−2.1, . . .) |

QPSK in Table 2 is quadrature phase shift keying corresponding to each CQI; and BLER is the target BLER.

For example, if the target BLER for the measurement feedback is 1E-5, and the second SINR is −3.5 dB, it can be determined after querying Table 2 that the corresponding CQI shall be 3 when the second SINR is −3.5 dB.

S306: The UE reports the determined CQI to the base station according to the CSI report resource and the CSI report mode carried by the base station in the indication information.

It may be determined that CQI equals to 3 after querying Table 2. In order to ensure timeliness of the CSI report, the short PUCCH is usually adopted, the reliability of the CSI report needs to be considered, and bits shall be reported as few as possible.

Thus, based on aforesaid steps S301-S306, the base station needs to update the received CQI after receiving the CQI reported by the UE to ensure the reliability of the data transmission, and then performs the data transmission after determining an MCS through the updated CQI.

Figure 4:
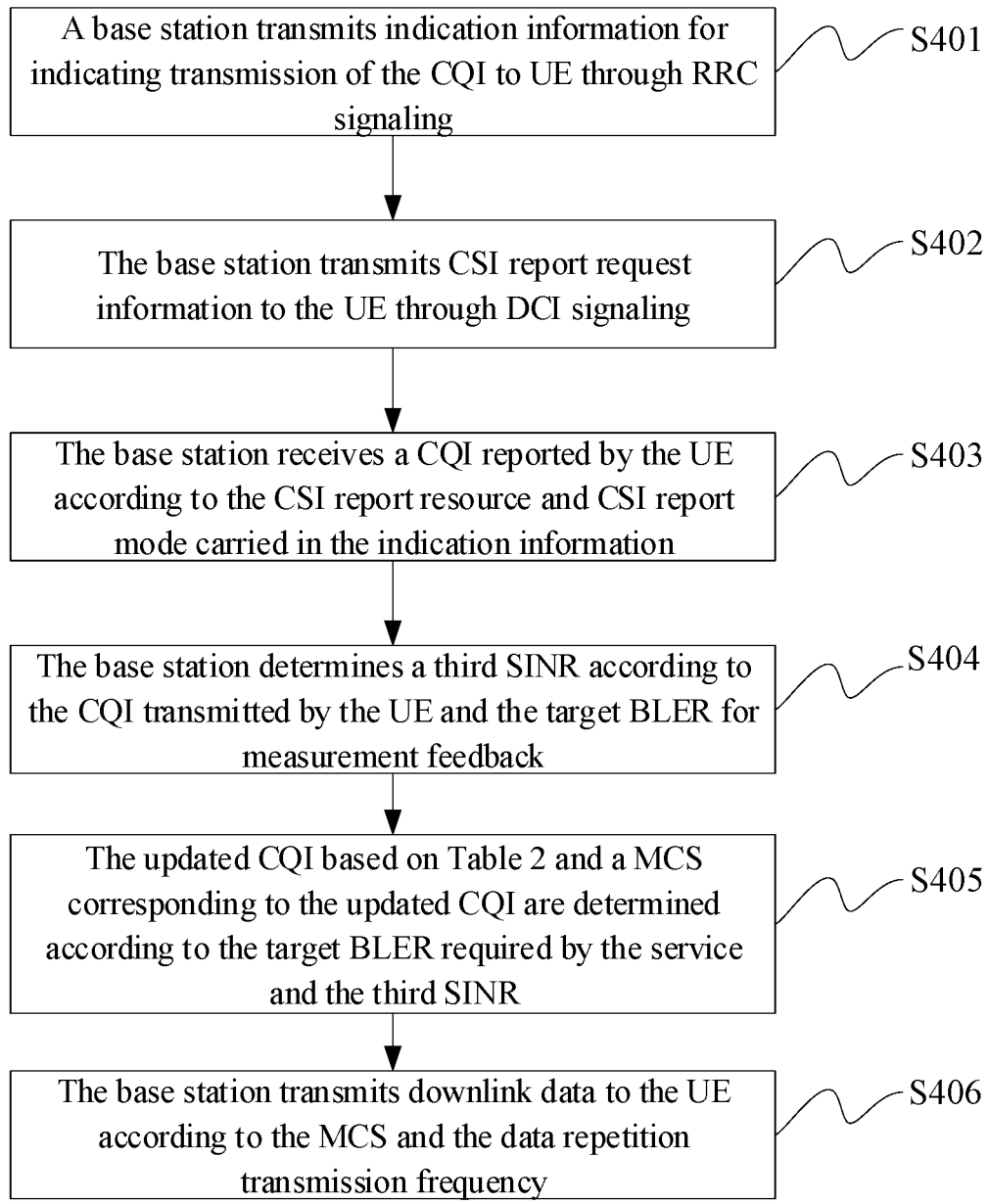
FIG. 4 is a specific schematic flowchart of a method for transmitting data provided by an embodiment of the present application.

For example, referring to FIG. 4, the method for transmitting data provided by the embodiment of the present application mainly includes following steps.

S401: A base station transmits indication information for indicating transmission of the CQI to UE through RRC signaling.

The indication information includes: a data repetition transmission number which is 2; a target BLER for measurement feedback which is $10^{-5}$; and a measurement resource of CSI which includes a CSI-RS resource of channel measurement and a CSI-RS resource of interference measurement, a CSI report resource and a CSI report mode, wherein the CSI report mode is an aperiodic short PUCCH report resource.

Steps S401 and S402 are not necessary steps for every transmission and thereby are optional steps.

S402: The base station transmits CSI report request information to the UE through DCI signaling.

The CSI report request information is for triggering CSI report of the UE, wherein the CSI report as triggered includes at least CQI report.

S403: The base station receives a CQI reported by the UE according to the CSI report resource and CSI report mode carried in the indication information.

For example, it may be determined according to Table 2 that the CQI fed back by the UE equals to 3.

S404: The base station determines a third SINR according to the CQI transmitted by the UE and the target BLER for measurement feedback.

For example, since the target BLER for the measurement feedback is 1E-5 and the target BLER required by a service is 1E-2, it is determined according to Table 2 that the CQI equals to 3; then, under the case where the BLER for the measurement feedback is 1E-5, a corresponding SINR range is (−4.1, −2.1), and thus the third SINR is determined to be −4.1 by taking a lower boundary value in the SINR range of (−4.1, −2.1) with a conservative value method.

S405: The updated CQI and a MCS corresponding to the updated CQI are determined according to the target BLER required by the service and the third SINR.

Upon executing the step S405, for example, if the target BLER required by the service is 1E-2, it can be determined that the CQI equals to 3 and the MCS is QPSK that equals to 120/1024 since −4.1 falls within the range of (−5.4, −3.2) after querying the data in Table 2; if the target BLER required by the service is 1E-1, it can be determined that the CQI equals to 3 and the MCS is the QPSK that equals to 120/1024 since −4.1 falls within the range of (−5.8, −3.8) after querying the data in Table 2; if the target BLER required by the service is 1E-3, it can be determined that the CQI equals to 3 and the MCS is the QPSK that equals to 120/1024 since −4.1 falls within the range of (−4.9, −2.8) after querying the data in Table 2; and if the target BLER required by the service is 1E-4, it can be determined that the CQI equals to 3 and the MCS is the QPSK that equals to 120/1024 since −4.1 falls within the range of (−4.5, −2.4) after querying the data in Table 2; if the target BLER required by the service is 1E-5, it can be determined that the CQI equals to 3 and the MCS is the QPSK that equals to 120/1024 since −4.1 falls within the range of (−4.1, −2.1) after querying the data in Table 2. Therefore, the data of Table 3 is obtained.

TABLE 3

| Target BLER for measure feedback | CQI index | Target BLER required by service | MCS |
| --- | --- | --- | --- |
| 1E-5 | 3 | 1E-1 | QPSK, 120/1024 |
| 1E-5 | | 1E-2 | QPSK, 120/1024 |
| 1E-5 | | 1E-3 | QPSK, 120/1024 |
| 1E-5 | | 1E-4 | QPSK, 120/1024 |

It should be noted that each CQI corresponds to a QPSK according to Table 2, so that the QPSK corresponding to the updated CQI can be determined after querying the Table 2, so that the MCS is determined. Table 3 is only for the data obtained after updating the CQI by taking an example where the third SINR equals to −4.1, and the data is not limited to the data in Table 3.

S406: The base station transmits downlink data to the UE according to the MCS and the data repetition transmission number.

It should be noted that the values in the Table 2 are only examples of the data, and do not mean that mapping must be performed according to the aforesaid data. The pre-stored correspondence among the target BLER, the SINR and the CQI can be stored at a UE side and/or a base station side, and if the correspondence is stored at both the UE side and the base station side, the correspondence stored at the base station side and the UE side has the same value.

Embodiment 2

In addition, when data is transmitted between the UE and the base station, the method for transmitting the CQI provided in the embodiment of the present application can also be used if a data repetition transmission number is not configured. The method specifically includes following steps.

Step 1: The base station transmits indication information for indicating transmission of the CQI to the UE through RRC signaling.

The indication information includes: a target BLER for measurement feedback which is 1E-5 and a CSI measurement resource. The measurement resource of CSI includes: a CSI-RS resource of channel measurement, a CSI-RS resource of interference measurement, a CSI report resource and a CSI report mode, wherein the CSI report mode is an aperiodic short PUCCH report resource.

Step 2: The UE determines a first SINR according to the received measurement of CSI resource and the CSI report mode.

Specifically, a noise power is calculated by measuring a signal power and an interference power for a single time on a CSI-RS of channel measurement and a CSI-RS of interference measurement, thereby calculating the first SINR. It is assumed that the first SINR equals to −6.5 dB. By determining the first SINR through the single measurement, the timeliness in calculating the first SINR can be improved.

Step 3: The UE determines the CQI corresponding to the first SINR and the target BLER for the measurement feedback according to a pre-stored correspondence among the target BLER, the SINR and the CQI.

For example, if the first SINR equals to −6.5 dB and the target BLER for the measurement feedback is 1E-5, the corresponding CQI is determined as 2 after querying Table 2; or, if the first SINR equals to −6.5 dB and the target BLER for the measurement feedback is 1E-1, the corresponding CQI is determined as 3 after querying Table 2.

Alternatively, the first SINR is corrected according to the mode in Embodiment 1, and since the data repetition transmission number is not configured in the indication information, the first SINR is corrected by default according to the data repetition transmission number of 1.

Figure 5:
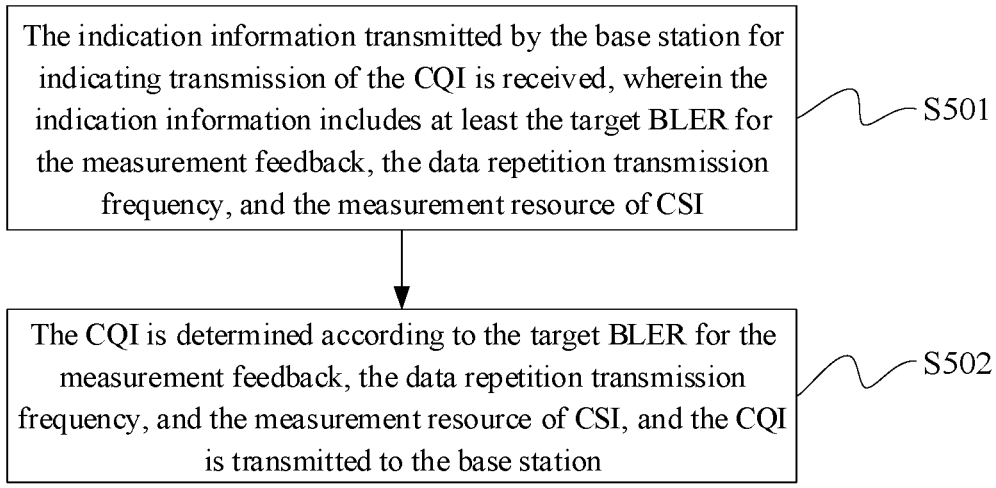
FIG. 5 is a schematic flowchart of a method for transmitting a CQI provided by an embodiment of the present application.
Figure 6:
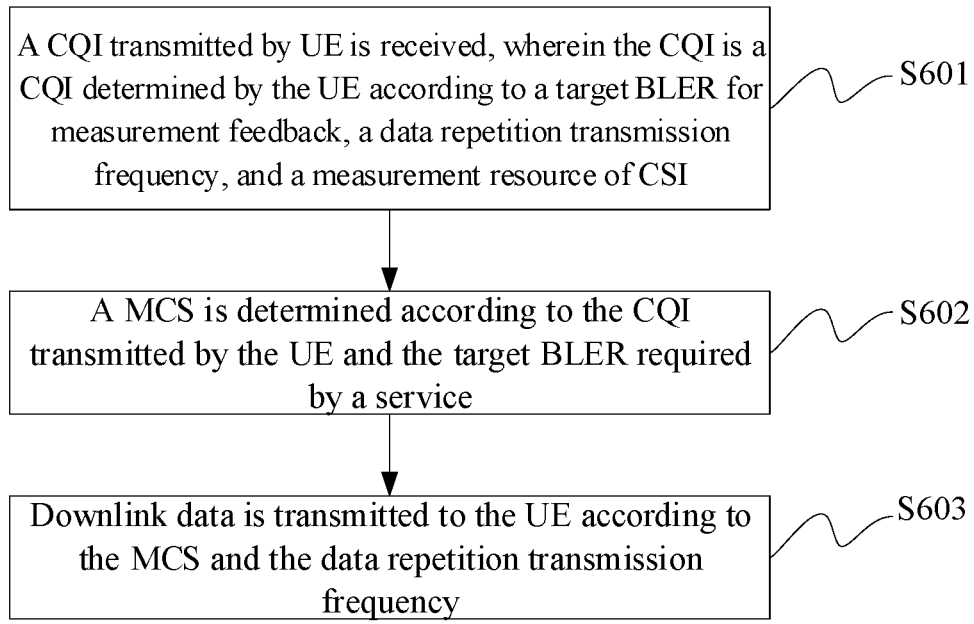
FIG. 6 is a schematic flowchart of a method for transmitting data provided by an embodiment of the present application.

Thus, based on the aforesaid embodiments, the embodiment of the present application provides a method for transmitting a CQI at a UE side. As shown in FIG. 5, the method includes following steps.

S501: The indication information transmitted by the base station for indicating transmission of the CQI is received, wherein the indication information includes at least the target BLER for the measurement feedback, the data repetition transmission number, and the measurement resource of CSI.

S502: The CQI is determined according to the target BLER for the measurement feedback, the data repetition transmission number, and the measurement resource of CSI, and the CQI is transmitted to the base station.

According to the specific embodiment, the indication information may also include the CSI report resource and the CSI report mode. The base station may transmit the indication information through RRC signaling and/or DCI signaling. According to the method for transmitting the CQI provided by the embodiment of the present application, while performing CQI feedback, the UE determines the CQI according to the target BLER for the measurement feedback, the data repetition transmission number, and the measurement resource of CSI. Thus, the UE feeds back the CQI by taking the data repetition transmission number and the target BLER for measurement feedback into consideration, so that the efficiency of data transmission is improved when the base station performs data transmission according to a value of the CQI.

According to the specific embodiment, in the method for transmitting the CQI provided by the embodiment of the present application, determining the CQI according to the target BLER for the measurement feedback, the data repetition transmission number and the measurement resource of CSI in S502 specifically includes: a first SINR is determined according to the measurement resource of CSI; explicit signaling or implicit signaling is transmitted by the base station for correcting the first SINR, and a second SINR is determined according to the data repetition transmission number and the first SINR; and the CQI is determined according to the target BLER for the measurement feedback and the second SINR.

Specifically, while determining the CQI according to the target BLER for measurement feedback, the data repetition transmission number, and the measurement resource of CSI, the first SINR is determined according to the measurement resource of CSI, and then the first SINR is further corrected according to the explicit signaling or the implicit signaling to obtain the second SINR. In addition, the data repetition transmission number shall be considered during correction of the first SINR, so as to further ensure accuracy of the CQI determined by the UE and thereby help to improve the efficiency when the base station transmits the data.

According to the specific embodiment, in the method for transmitting the CQI provided by the embodiment of the present application, determining the explicit signaling transmitted by the base station for correcting the first SINR includes: receiving the explicit signaling transmitted by the base station for correcting the first SINR through the RRC signaling and/or DCI signaling.

Specifically, resources occupied by the signaling can be saved by transmitting the explicit signaling through the RRC signaling and/or the DCI signaling. While transmitting the indication information through the RRC signaling and/or the DCI signaling, the base station may also carry the explicit signaling for correcting the first SINR, so that the UE does not directly feed back the CQI after determining the first SINR but selects to feed back the CQI after correcting the first SINR to obtain the second SINR. The specific explanation may refer to the Embodiment 1. In addition, if the explicit signaling or implicit signaling for correcting the first SINR is not received, the step of correcting the first SINR is omitted, and the corresponding CQI is determined directly according to the first SINR.

According to the specific embodiment, in the method for transmitting the CQI provided by the embodiment of the present application, determining the implicit signaling transmitted by the base station for correcting the first SINR includes: determining the target BLER for the measurement feedback as a target BLER corresponding to URLLC according to the target BLER for the measurement feedback.

Specifically, the resources occupied by the signaling can be saved by determining whether the first SINR needs to be corrected in an implicit signaling manner. Of course, if the explicit signaling or the implicit signaling for correcting the first SINR is not received, the step of correcting the first SINR is omitted, and the corresponding CQI is determined directly according to the first SINR. The specific explanation may refer to the Embodiment 2.

According to the specific embodiment, correcting the first SINR according to the method for transmitting the CQI provided by the embodiment of the present application includes following modes.

Mode 1: The second SINR is determined according to the data repetition transmission number and the first SINR with a following formula:

$B=A+10*\log10(N)$, wherein N is a positive integer, wherein N represents the data repetition transmission number, A represents the first SINR, and B represents the second SINR.

Mode 2: The second SINR corresponding to the data repetition transmission number and the first SINR is determined according to a pre-stored correspondence among the data repetition transmission number, the first SINR and the second SINR.

According to the specific embodiment, in the method for transmitting the CQI provided by the embodiment of the present application, determining the CQI according to the target BLER for the measurement feedback and the second SINR includes: determining the CQI corresponding to the target BLER for the measurement feedback and the second SINR according to the pre-stored correspondence among the target BLER, the SINR and the CQI.

For example, the corresponding CQI may be determined by querying Table 2 provided in the Embodiment 1.

Based on the same inventive concept, the method for transmitting data provided by the embodiment of the present application at the base station side includes following steps.

S601: A CQI transmitted by UE is received, wherein the CQI is a CQI determined by the UE according to a target BLER for measurement feedback, a data repetition transmission number, and a measurement resource of CSI.

S602: A MCS is determined according to the CQI transmitted by the UE and the target BLER required by a service.

S603: Downlink data is transmitted to the UE according to the MCS and the data repetition transmission number.

Specifically, according to the embodiment of the present application, after receiving the CQI transmitted by the UE, the base station further determines the MCS based on the CQI transmitted by the UE and the target BLER required by the service, so that the base station not only determines the CQI with reference to the target BLER for the measurement feedback, but also determines the corresponding MCS with reference to the target BLER required by the service during the data transmission, thereby improving the efficiency of data transmission.

Optionally, in the method for transmitting data provided by the embodiment of the present application, determining the MCS according to the CQI transmitted by the UE and the target BLER required by the service in S602 includes: a third SINR is determined according to the CQI transmitted by the UE and the target BLER for the measurement feedback when the target BLER required by the service is inconsistent with the target BLER for the measurement feedback; and determining the MCS according to the third SINR and the target BLER required by the service.

Optionally, in the method for transmitting data provided by the embodiment of the present application, determining the third SINR according to the CQI transmitted by the UE and the target BLER for the measurement feedback includes: determining the third SINR corresponding to the CQI transmitted by the UE and the target BLER for the measurement feedback according to a pre-stored correspondence among the target BLER, the SINR and the CQI.

Optionally, in the method for transmitting data provided by the embodiment of the present application, before receiving the CQI transmitted by the UE, the method further includes: transmitting indication information for indicating transmission of the CQI to the UE, wherein the indication information includes at least the target BLER for the measurement feedback, the data repetition transmission number, and the measurement resource of CSI.

Optionally, in the method for transmitting data provided by the embodiment of the present application, before receiving the CQI transmitted by the UE, the method further includes: transmitting explicit signaling or implicit signaling for correcting the first SINR to the UE, wherein the first SINR is determined by the UE according to a measurement resource of CSI.

Optionally, in the method for transmitting data provided by the embodiment of the present application, transmitting the explicit signaling for correcting the first SINR to the UE includes:

transmitting a correction instruction for correcting the first SINR to the UE through RRC signaling and/or DCI signaling.

The method provided by the embodiment of the present application may be applied to terminal equipment and network equipment.

The terminal equipment may also be referred to as the UE, a Mobile Station (MS), a mobile terminal, etc. Optionally, the terminal may have the ability to communicate with one or more core networks via a RAN. For example, the terminal may be a mobile phone (or "cellular" phone) or a computer with a mobile attribute. For example, the terminal may also be a portable, pocket, handheld, computer built-in or in-vehicle mobile device.

The network equipment may be a base station (such as, an access point), which refers to equipment that communicates with a wireless terminal through one or more sectors on an air interface in an access network. The base station may be configured to convert received air frames and IP packets into each other, and act as a router between the wireless terminal and the rest of the access network, wherein the rest of the access network may include an Internet Protocol (IP) network. The base station may also coordinate the attribute management of the air interface. For example, the base station may be a BTS in GSM or CDMA, a base station (NodeB) in WCDMA, or an evolutional node B (NodeB or eNB or e-NodeB) in LTE, which is not limited in the embodiment.

The processing flow of the method may be implemented by a software program, which may be stored in a storage medium, and steps of the method are executed when the stored software program is called.

Figure 7:
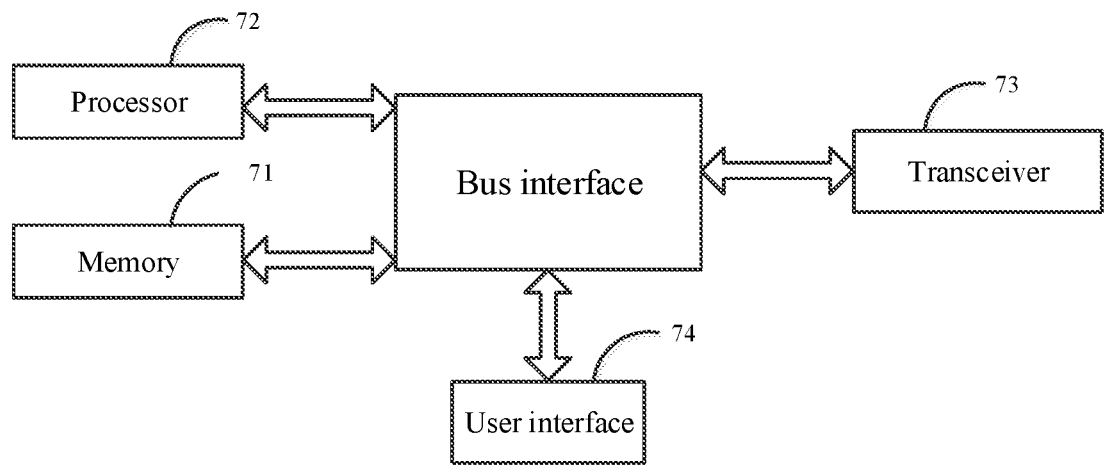
FIG. 7 is a schematic structural diagram of a device for transmitting a CQI provided by an embodiment of the present application.

Based on the same inventive concept, the embodiment of the present application provides a device for transmitting a CQI at the UE side. Referring to FIG. 7, the device includes a memory 71 and a processor 72.

The processor 72 is configured to read the program in the memory and execute the following processes:

receiving indication information transmitted by a base station for indicating transmission of the CQI via a transceiver 73, wherein the indication information includes at least a target BLER for measurement feedback, a data repetition transmission number, and a measurement resource of CSI; and determining the CQI according to the target BLER for the measurement feedback, the data repetition transmission number, and the measurement resource of CSI, and transmitting the CQI to the base station via the transceiver.

Optionally, in the device for transmitting the CQI provided by the embodiment of the present application, determining the CQI according to the target BLER for the measurement feedback, the data repetition transmission number and the measurement resource of CSI specifically includes: determining a first SINR according to the measurement resource of CSI; determining explicit signaling or implicit signaling transmitted by the base station for correcting the first SINR, and determining a second SINR according to the data repetition transmission number and the first SINR; and determining the CQI according to the target BLER for the measurement feedback and the second SINR.

Optionally, in the device for transmitting the CQI provided by the embodiment of the present application, determining the explicit signaling transmitted by the base station for correcting the first SINR specifically includes: receiving the explicit signaling transmitted by the base station for correcting the first SINR through RRC signaling and/or DCI signaling through the transceiver.

Optionally, in the device for transmitting the CQI provided by the embodiment of the present application, determining the implicit signaling transmitted by the base station for correcting the first SINR specifically includes: determining the target BLER for the measurement feedback as a target BLER corresponding to URLLC according to the target BLER for the measurement feedback.

Optionally, in the device for transmitting the CQI provided by the embodiment of the present application, the second SINR is determined according to the data repetition transmission number and the first SINR with a following formula: $B=A+10*\log 10(N)$, wherein N is a positive integer, wherein N represents the data repetition transmission number, A represents the first SINR, and B represents the second SINR.

Optionally, in the device for transmitting the CQI provided by the embodiment of the present application, determining the second SINR according to the data repetition transmission number and the first SINR specifically includes: determining the second SINR corresponding to the data repetition transmission number and the first SINR according to a pre-stored correspondence among the data repetition transmission number, the first SINR and the second SINR.

Optionally, in the device for transmitting the CQI provided by the embodiment of the present application, determining the CQI according to the target BLER for the measurement feedback and the second SINR specifically includes: determining the CQI corresponding to the target BLER for the measurement feedback and the second SINR according to a pre-stored correspondence among the target BLER, the SINR and the CQI.

The transceiver 73 in the embodiment of the present application is configured to receive and transmit data under the control of the processor 72.

In FIG. 7, the bus architecture may include any quantity of interconnected buses and bridges. Specifically, various circuits of one or more processors represented by the processor 72 and the memory represented by the memory 71 are linked together. The bus architecture may also link various other circuits together, such as peripherals, voltage regulators, and power management circuits, which is well known in the art and thereby will not be detailed in the present application. A bus interface provides an interface. The transceiver 73 may be a plurality of elements, which namely includes a transmitter and a receiver for providing a unit for communicating with various other devices on a transmission medium. For different UE, the user interface 74 may be an interface capable of connecting externally and internally with equipment as required, and the equipment as connected includes but is not limited to a keypad, a display, a speaker, a microphone, a joystick, and the like.

The processor 72 is responsible for managing the bus architecture and general processing, and the memory 71 may store the data used by the processor 72 during the operation.

Figure 8:
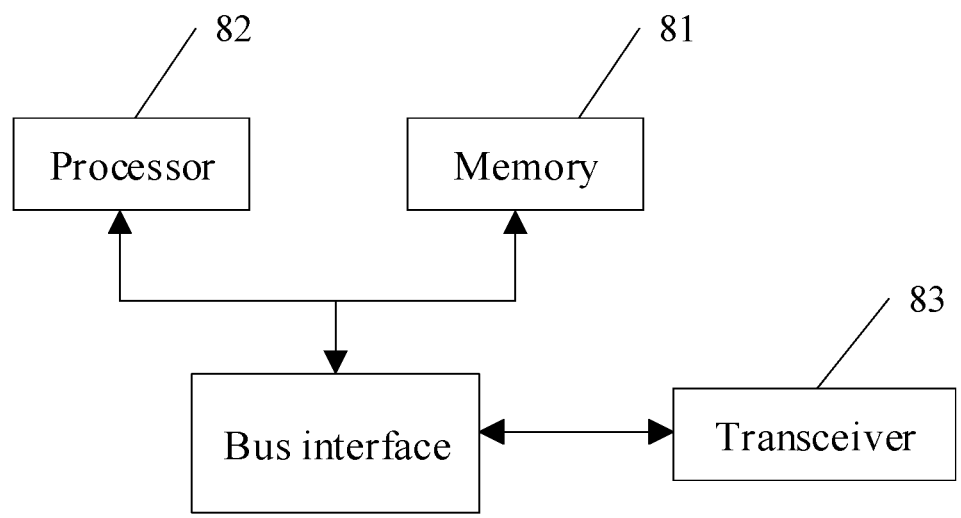
FIG. 8 is a schematic structural diagram of a device for transmitting data provided by an embodiment of the present application.

Based on the same inventive concept, the embodiment of the present application provides a device for transmitting data at the base station side. Referring to FIG. 8, the device includes a memory 81 and a processor 82.

The processor 82 is configured to read a program in the memory 81 and execute the following processes:

receiving a CQI transmitted by UE via a transceiver 83, wherein the CQI is a CQI determined by the UE according to a target BLER for measurement feedback, a data repetition transmission number, and a measurement resource of CSI;

determining a MCS according to the CQI transmitted by the UE and the target BLER required by a service; and transmitting downlink data to the UE according to the MCS and the data repetition transmission number.

Optionally, in the device for transmitting data provided by the embodiment of the present application, determining the MCS according to the CQI transmitted by the UE and the target BLER required by the service specifically includes: determining a third SINR according to the CQI transmitted by the UE and the target BLER for the measurement feedback when the target BLER required by the service is inconsistent with the target BLER for the measurement feedback; and determining the MCS according to the third SINR and the target BLER required by the service.

Optionally, in the device for transmitting data provided by the embodiment of the present application, determining the third SINR according to the CQI transmitted by the UE and the target BLER for the measurement feedback includes: determining the CQI transmitted by the UE and the third SINR corresponding to the target BLER for the measurement feedback according to a pre-stored correspondence among the target BLER, the SINR and the CQI.

Optionally, in the device for transmitting data provided by the embodiment of the present application, before receiving the CQI transmitted by the UE via the transceiver, the processor is further configured to: transmit indication information for indicating transmission of the CQI to the UE via the transceiver, wherein the indication information includes at least the target BLER for the measurement feedback, the data repetition transmission number, and the measurement resource of CSI.

Optionally, in the device for transmitting data provided by the embodiment of the present application, before receiving the CQI transmitted by the UE via the transceiver, the processor is further configured to: transmit explicit signaling or implicit signaling for correcting the first SINR to the UE via the transceiver, wherein the first SINR is determined by the UE according to the measurement resource of CSI.

Optionally, in the device for transmitting CQI provided by the embodiment of the present application, transmitting the explicit signaling for correcting the first SINR to the UE via the transceiver specifically includes: transmitting a correction instruction for correcting the first SINR to the UE through RRC signaling and/or DCI signaling.

The transceiver 83 in the embodiment of the present application is configured to receive and transmit data under the control of the processor 82.

In FIG. 8, a bus architecture may include any quantity of interconnected buses and bridges. Specifically, various circuits of one or more processors represented by the processor 82 and the memory represented by the memory 81 are linked together. The bus architecture may also link various other circuits together, such as peripherals, voltage regulators, and power management circuits, which is well known in the art and thereby will not be detailed in the present application. A bus interface provides an interface. The transceiver 83 may be a plurality of elements, which namely includes a transmitter and a transceiver for providing a unit for communicating with various other devices on a transmission medium. The processor 82 is responsible for managing the bus architecture and general processing, and the memory 81 may store the data used by the processor 82 during the operation.

The processor according to any one of the embodiments of the present application may be a central processing unit (CPU), an application specific integrated circuit (ASIC), a field-programmable gate array (FPGA) or a complex programmable logic device (CPLD).

Figure 9:
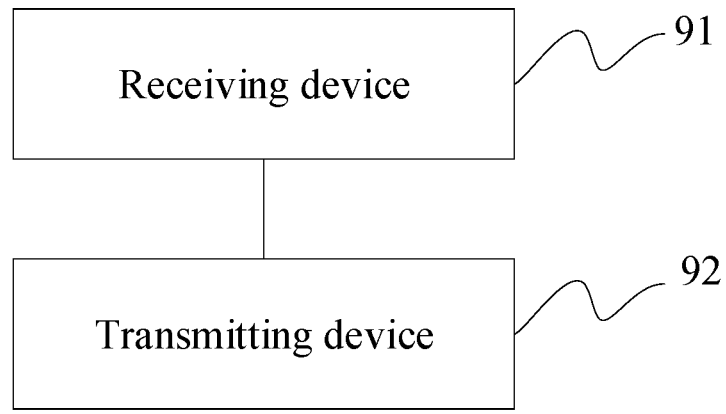
FIG. 9 is a schematic structural diagram of another device for transmitting a CQI provided by an embodiment of the present application.

Based on the same inventive concept, the embodiment of the present application further provides a device for transmitting a CQI at the UE side. Referring to FIG. 9, the device includes:

a receiving unit 91, configured to receive indication information transmitted by a base station for indicating transmission of a CQI, wherein the indication information includes at least a target BLER for measurement feedback, a data repetition transmission number, and a measurement resource of CSI; and a transmitting unit 92, configured to determine the CQI according to the target BLER for the measurement feedback, the data repetition transmission number, and the measurement resource of CSI, and transmit the CQI to the base station.

Figure 10:
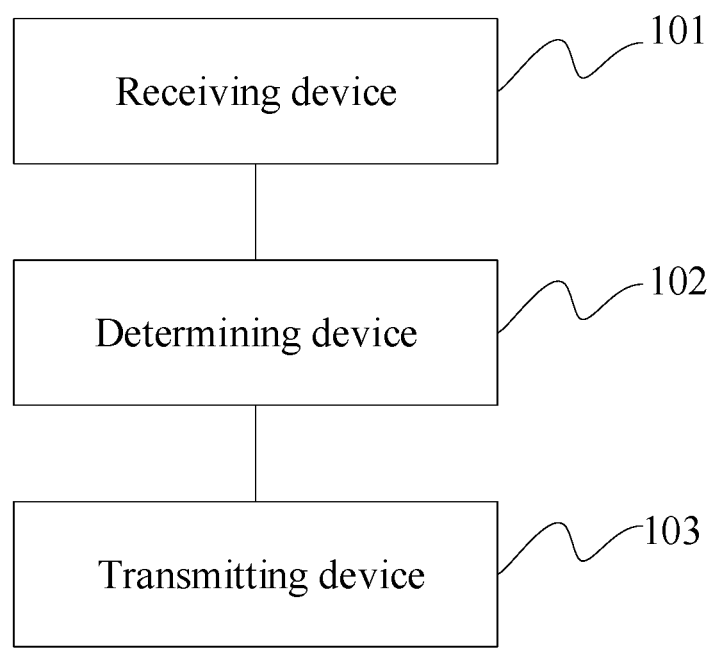
FIG. 10 is a schematic structural diagram of another device for transmitting data provided by an embodiment of the present application.

Based on the same inventive concept, the embodiment of the present application further provides a device for transmitting data at the base station side. Referring to FIG. 10, the device includes:

a receiving unit 101, configured to receive a CQI transmitted by UE, wherein the CQI is a CQI determined by the UE according to a target BLER for measurement feedback, a data repetition transmission number, and a measurement resource of CSI;

a determining unit 102, configured to determine a MCS according to the CQI transmitted by the UE and the target BLER required by a service; and a transmitting unit 103, configured to transmit downlink data to the UE according to the MCS and the data repetition transmission number.

The device according to the embodiment of the present application may also include input/output devices, etc. The input device may include a keyboard, a mouse, a touch screen, etc., and the output device may include display devices, such as a liquid crystal display (LCD), a cathode ray tube (CRT), etc.

The memory may include an ROM and a RAM, and provide the processor with program instructions and data stored in the memory. In the embodiment of the present application, the memory may be configured to store the program according to any one of the methods provided in the embodiments of the present application.

By calling the program instructions stored in the memory, the processor is configured to execute any one of the methods provided in the embodiments of the present application according to the obtained program instructions.

Based on the same inventive concept, the embodiment of the present application provides a computer storage medium in which program codes are stored. When executed on a computing device, the program codes actuate the computing device to execute any one of the methods provided in the embodiments of the application.

The computer storage medium may be any available medium or data storage device that can be accessed by a computer, including but not limited to magnetic storages (such as a floppy disk, a hard disk, magnetic tape, an MO, etc.), optical storages (such as a CD, a DVD, a BD, an HVD, etc.), semiconductor storages (such as an ROM, an EPROM, an EEPROM, an NAND FLASH, an SSD), and the like.

Embodiments of the present application may be provided as a method, a system, or a computer program product. Therefore, the present application may be in the form of full hardware embodiments, full software embodiments, or a combination thereof. Moreover, the present application may be in the form of a computer program product that is implemented on one or more computer-usable storage media (including, without limitation, magnetic disk storages and the optical storages) containing computer-usable program codes.

The present application is described referring to the flow chart and/or block diagram of the method, device (system) and computer program product according to the embodiments of the present application. It should be understood that, each flow and/or block in the flow chart and/or block diagram and the combination of flow and/or block in the flow chart and/or block diagram may be realized via computer program instructions. Such computer program instructions may be provided to the processor of a general-purpose computer, special-purpose computer, a built-in processor or other programmable data processing devices, to produce a machine, so that the instructions executed by the processor of the computer or the other programmable data processing devices may produce a device for realizing the functions specified in one or more flows in the flow chart and/or one or more blocks in the block diagram.

Such computer program instructions may also be stored in a computer-readable storage that can guide the computer or the other programmable data processing devices to work in a specific mode, so that the instructions stored in the computer-readable storage may produce a manufacture including commander equipment, wherein the commander equipment may realize the functions specified in one or more flows of the flow chart and one or more blocks in the block diagram.

Such computer program instructions may also be loaded to the computer or the other programmable data processing devices, so that a series of operational processes may be executed on the computer or the other programmable devices to produce computer-realized processing, thereby the instructions executed on the computer or the other programmable devices may provide a process for realizing the functions specified in one or more flows in the flow chart and/or one or more blocks in the block diagram.

What is claimed is:

1. A method for transmitting a channel quality indication (CQI), comprising:
   receiving indication information transmitted by a base station for indicating transmission of the CQI, wherein the indication information comprises at least a target block error ratio (BLER) for measurement feedback, a data repetition transmission number, and a measurement resource of channel state information (CSI);
   determining the CQI according to the target BLER for the measurement feedback, the data repetition transmission number, and the measurement resource of CSI; and
   transmitting the CQI to the base station;
   wherein the determining the CQI according to the target BLER for the measurement feedback, the data repetition transmission number, and the measurement resource of CSI comprises:
   determining a first signal to interference plus noise ratio (SINR) according to the measurement resource of CSI;
   determining explicit signaling or implicit signaling transmitted by the base station for correcting the first SINR;
   determining a second SINR according to the data repetition transmission number and the first SINR; and
   determining the CQI according to the target BLER for the measurement feedback and the second SINR.

2. The method according to claim 1, wherein said determining the explicit signaling transmitted by the base station for correcting the first SINR comprises:
   receiving the explicit signaling transmitted by the base station for correcting the first SINR through radio resource control (RRC) signaling and/or downlink control information (DCI) signaling.

3. The method according to claim 1, wherein said determining the implicit signaling transmitted by the base station for correcting the first SINR comprises:
   determining the target BLER for the measurement feedback as a target BLER corresponding to ultra reliable and low latency communications (URLLC) according to the target BLER for the measurement feedback.

4. The method according to claim 1, wherein the second SINR is determined according to the data repetition transmission number and the first SINR with a following formula:

$$B=A+10*\log 10(N), \text{ wherein } N \text{ is a positive integer,}$$

wherein N represents the data repetition transmission number, A represents the first SINR, and B represents the second SINR.

5. The method according to claim 1, wherein said determining the second SINR according to the data repetition transmission number and the first SINR comprises:
   determining the second SINR corresponding to the data repetition transmission number and the first SINR according to a pre-stored correspondence among the data repetition transmission number, the first SINR and the second SINR.

6. The method according to claim 1, wherein said determining the CQI according to the target BLER for the measurement feedback and the second SINR comprises:
   determining the CQI corresponding to the target BLER for the measurement feedback and the second SINR according to a pre-stored correspondence among the target BLER, the SINR and the CQI.

7. A method for transmitting data, comprising:
   receiving a channel quality indication (CQI) transmitted by user equipment (UE), wherein the CQI is a CQI determined by the UE according to a target block error ratio (BLER) for measurement feedback and a second signal to interference plus noise ratio (SINR), wherein the second SINR is determined by the UE according to a data repetition transmission number and a first SINR in response to received explicit signaling or implicit signaling for correcting the first SINR, wherein the first SINR is determined by the UE according to a measurement resource of channel state information (CSI);
   determining a modulation and coding strategy (MCS) according to the CQI transmitted by the UE and the target BLER required by a service; and
   transmitting downlink data to the UE according to the MCS and the data repetition transmission number.

8. The method according to claim 7, wherein said determining the MCS according to the CQI transmitted by the UE and the target BLER required by the service comprises:

determining a third (SINR) according to the CQI transmitted by the UE and the target BLER for the measurement feedback, when the target BLER required by the service is inconsistent with the target BLER for the measurement feedback; and determining the MCS according to the third SINR and the target BLER required by the service.

9. The method according to claim 8, wherein said determining the third SINR according to the CQI transmitted by the UE and the target BLER for the measurement feedback comprises:

determining the CQI transmitted by the UE and the third SINR corresponding to the target BLER for the measurement feedback, according to a pre-stored correspondence among the target BLER, the SINR and the CQI.

10. The method according to claim 7, wherein before receiving the CQI transmitted by the UE, the method further comprises:

transmitting indication information for indicating transmission of the CQI to the UE, wherein the indication information comprises at least the target BLER for the measurement feedback, the data repetition transmission number, and the measurement resource of CSI.

11. The method according to claim 7, wherein before receiving the CQI transmitted by the UE, the method further comprises:

transmitting explicit signaling or implicit signaling for correcting the first SINR to the UE.

12. The method according to claim 11, wherein said transmitting the explicit signaling for correcting the first SINR to the UE comprises:

transmitting a correction instruction for correcting the first SINR to the UE through radio resource control (RRC) signaling and/or downlink control information (DCI) signaling.

13. A device for transmitting a channel quality indication (CQI), comprising:

a memory, configured to store program instructions; and a processor, configured to call the program instructions stored in the memory and execute following operations according to programs as obtained:

receiving indication information transmitted by a base station for indicating transmission of the CQI via a transceiver, wherein the indication information comprises at least a target block error ratio (BLER) for measurement feedback, a data repetition transmission number, and a measurement resource of channel state information (CSI);

determining the CQI according to the target BLER for the measurement feedback, the data repetition transmission number, and the measurement resource of CSI; and transmitting the CQI to the base station via the transceiver;

wherein said determining the CQI according to the target BLER for the measurement feedback, the data repetition transmission number, and the measurement resource of CSI comprises:

determining a first signal to interference plus noise ratio (SINR) according to the measurement resource of CSI, determining explicit signaling or implicit signaling transmitted by the base station for correcting the first SINR;

determining a second SINR according to the data repetition transmission number and the first SINR; and determining the CQI according to the target BLER for the measurement feedback and the second SINR.

14. The device according to claim 13, wherein said determining the explicit signaling transmitted by the base station for correcting the first SINR comprises:

receiving the explicit signaling transmitted by the base station for correcting the first SINR through radio resource control (RRC) signaling and/or downlink control information (DCI) signaling.

15. The device according to claim 13, wherein said determining the implicit signaling transmitted by the base station for correcting the first SINR comprises:

determining the target BLER for the measurement feedback as a target BLER corresponding to ultra reliable and low latency communications (URLLC) according to the target BLER for the measurement feedback.

16. The device according to claim 13, wherein the second SINR is determined according to the data repetition transmission number and the first SINR with a following formula:

$B=A+10*\log10(N)$, wherein $N$ is a positive integer, wherein N represents the data repetition transmission number, A represents the first SINR, and B represents the second SINR.

17. The device according to claim 13, wherein said determining the second SINR according to the data repetition transmission number and the first SINR comprises:

determining the second SINR corresponding to the data repetition transmission number and the first SINR according to a pre-stored correspondence among the data repetition transmission number, the first SINR and the second SINR.

18. The device according to claim 13, wherein said determining the CQI according to the target BLER for the measurement feedback and the second SINR comprises:

determining the CQI corresponding to the target BLER for the measurement feedback and the second SINR according to a pre-stored correspondence among the target BLER, the SINR and the CQI.

* * * * *